United States Patent [19] [11] 4,387,211
Yasuda et al. [45] Jun. 7, 1983

[54] PROCESS FOR PRODUCING NEW POLYESTER RESIN AND PRODUCT THEREOF

[75] Inventors: Shinichiro Yasuda; Eiji Morimoto; Atsushi Sonobe, all of Wakayama, Japan

[73] Assignee: Kao Soap Co., Ltd., Tokyo, Japan

[21] Appl. No.: 332,891

[22] Filed: Dec. 21, 1981

[30] Foreign Application Priority Data

Dec. 26, 1980 [JP] Japan ................. 55-187193

[51] Int. Cl.³ .............. C08G 63/18; C08G 63/32; C08G 63/34
[52] U.S. Cl. ................ 528/179; 528/176; 528/180; 528/181; 528/182; 528/192; 528/194
[58] Field of Search ........ 528/192, 194, 176, 179–182

[56] References Cited

U.S. PATENT DOCUMENTS 2,634,251 4/1953 Kass ........................... 528/194
3,397,254 8/1968 Wynstra et al. ............ 528/194
3,440,218 4/1969 Caldwell ..................... 528/194
3,754,909 8/1973 Feltzin et al. ............... 528/192
4,123,454 10/1978 Buxbaum ................... 528/194

Primary Examiner—Lester L. Lee
Attorney, Agent, or Firm—Flynn, Thiel, Boutell & Tanis

[57] ABSTRACT

A new polyester resin is produced by condensation polymerization of (a) a diol component of the formula:

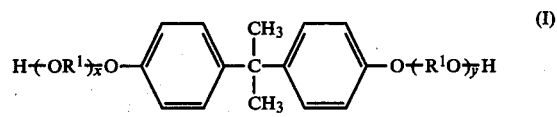

wherein $R^1$ is an alkylene group of 2 to 4 carbon atoms; and x and y are positive integers, the sum of them being 2 to 16 on an average, and (b) an acid component of polybasic (at least dibasic) carboxylic acid, anhydride thereof, and lower alkyl ester thereof, said acid component (b) containing 1 to 50 mol % of a dibasic carboxylic acid or anhydride thereof of the formula:

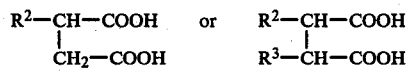

where $R^2$ and $R^3$ are saturated or unsaturated hydrocarbon groups of 4 to 20 carbon atoms and 10 to 30 mol % of trimellitic acid or anhydride thereof. The polyester has improved toughness, abrasion resistance and flexibility.

12 Claims, No Drawings

PROCESS FOR PRODUCING NEW POLYESTER RESIN AND PRODUCT THEREOF

The present invention relates to a process for producing a new polyester resin which has outstanding toughness, abrasion resistance, and flexibility.

Heretofore, there are known several processes for the production of polyester resins. According to such processes, (1) linear polyesters are produced by reacting a dicarboxylic acid with a diol, (2) etherified diphenyl nonlinear polyesters are produced by reacting an etherified polyhydroxyl compound as a third component in addition to the above-mentioned two components and (3) nonlinear polyesters are produced by reacting a polybasic (at least tribasic) carboxylic acid as a third component in addition to the above-mentioned two components.

The polyester resins produced by these processes afford good performance to some extent, but they still have some disadvantages. For instance, the foregoing linear polyester resin is readily soluble in the unsaturated monomer but lacks toughness and abrasion resistance, and consequently it is not necessarily satisfactory in performance as a curable polyester resin. It may be used as a binder for toners used in electrophotography, but it cannot be used for a high-speed copying machine which employs a heat roller for fixation. If it is used for such a copying machine, it will cause offset problems.

Nonlinear polyesters, too, have a disadvantage. If an etherified polyhydroxyl compound is used as a third component, the resulting polyester resin is improved in toughness and abrasion resistance, while maintaining solubility in the unsaturated monomer to some extent. Nevertheless, it is not improved in the glass transition temperature and tends to form a mass when used in the form of a powder. On account of these disadvantages, the nonlinear polyester cannot be used as a binder for a glass fiber mat or as a binder for toners used in electrophotography.

Moreover, the nonlinear polyester resin produced by reacting a polybasic (at least tribasic) carboxylic acid as a third component is not improved in its properties if the acid is used in a small quantity. On the other hand, if the quantity of the acid is increased to produce a good effect, the resulting polyester resin becomes rigid and brittle and its softening point rises. In addition it is insoluble in the unsaturated monomer. Thus, such a polyester cannot be used as a curable polyester, and it tends to solidify in the reaction vessel during production. This entails danger in the manufacturing process.

Under these circumstances, there has been a demand for a polyester resin which is outstanding in toughness and abrasion resistance, is soluble in the unsaturated monomer, has a comparatively high glass transition temperature and an adequate softening point.

In order to overcome the above disadvantages, the present inventors have carried out a series of researchers which led to this invention.

This invention relates to a process for producing a new polyester resin by condensation polymerization of (a) a diol component represented by the formula:

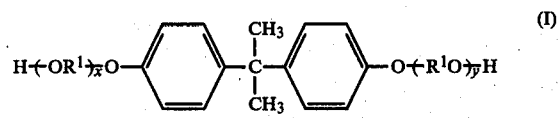

wherein $R^1$ is an alkylene group of 2 to 4 carbon atoms and x and y are positive integers, the sum of x and y being 2 to 16 on the average, and (b) an acid component selected from the group consisting of polybasic (at least dibasic) carboxylic acids, anhydrides thereof, and lower alkyl esters thereof, said process being characterized in that said acid component (b) contains 1 to 50 mol % of a dibasic carboxylic acid or anhydride thereof represented by the formulas:

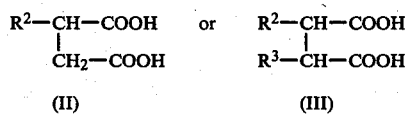

wherein $R^2$ and $R^3$ are saturated or unsaturated hydrocarbon groups of 4 to 20 carbon atoms, and 10 to 30 mol % of trimellitic acid or anhydride thereof.

The greater the amount of trimellitic acid or anhydride thereof that is used, the higher is the glass transition temperature of the resulting resin and the more the abrasion resistance of the resulting resin improves. This improvement is made at the cost of increased rigidity. On the other hand, the greater the amount the acid compound or anhydride thereof represented by the formula (II) or (III) that is used, the more the resulting resin improves in impact resistance, flexing resistance, and solubility. This improvement is made at the cost of lowered glass transition temperature and the tendency that the powder of the resin tends to form a mass. These merits and demerits can be balanced if the quantity of the trimellitic acid or anhydride thereof is limited to 10 to 30 mol %, preferably 20 to 30 mol %, in the acid component (b), and the quantity of the acid compound or anhydride thereof represented by the formula (II) or (III) is limited to 1 to 50 mol % in the acid compound (b).

Examples of acid components (b) other than (II) and (III) include phthalic acid, isophthalic acid, terephthalic acid, fumaric acid, maleic acid, anhydrides thereof, and lower alkyl esters thereof, which are used for the production of known polyesters.

The polyester resin produced according to the process of this invention can be used (1) in the form of a powder, (2) in the form of a solution in an organic solvent, and (3) in the form of a solution in an unsaturated monomer. For application (3), it is necessary to use fumaric acid or maleic acid, each of which is an unsaturated dicarboxylic acid, as part of the acid component (b) other than (II) and (III); but for applications of (1) and (2), there is no limitation as to the kind of additional acid to be used.

The polyester resin produced according to the process of this invention has a softening point of 80° to 150° C., preferably 100° to 140° C., as measured by the ring and ball method.

The polyester resin produced according to the process of this invention can be used in the form of a powder as a binder for a glass fiber mat and a binder for electrophotographic toners, and in the form of a solution in an organic solvent as a binder to bond a photoconductive substance to a substrate.

If an unsaturated dicarboxylic acid or anhydride thereof is used as part of the acid component (b), the polyester of this invention can be used as a so-called thermosetting polyester resin after being dissolved in an unsaturated monomer such as styrene, vinyltoluene, chlorostyrene, or diallylphthalate.

Examples of the diol which is used in this invention and is represented by the formula:

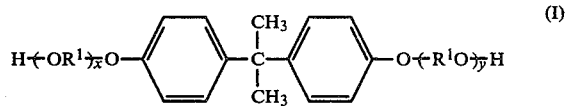

(where $R^1$, x, and y are as defined above) include polyoxypropylene (2.2)-2,2-bis(4-hydroxyphenyl) propane, polyoxyethylene(2)-2,2-bis(4-hydroxyphenyl)propane, polyoxypropylene(6)-2,2-bis(4-hydroxyphenyl)propane, and polyoxypropylene(16)-2,2-bis(4-hydroxyphenyl)propane.

Examples of the dibasic carboxylic acid which is used in this invention and is represented by the formula:

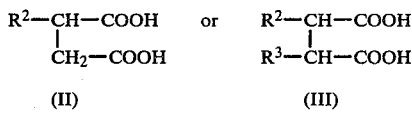

(where $R^2$ and $R^3$ are as defined above) include n-dodecenylsuccinic acid, iso-dodecenylsuccinic acid, n-dodecylsuccinic acid, iso-dodecylsuccinic acid, iso-octylsuccinic acid, and n-butylsuccinic acid.

The diol component used in this invention may contain less than about 5 mol % of a polyhydroxyl compound which is at least difunctional.

Examples of such polyhydroxyl compounds include ethylene glycol, propylene glycol, glycerin, pentaerythritol, trimethylolpropane, hydrogenated bisphenol A, sorbitol, or etherified polyhydroxyl compounds thereof such as polyoxyethylene(10) sorbitol, polyoxypropylene(3) glycerin, and polyoxyethylene(4) pentaerythritol.

According to the process of this invention, the polyester resin can be produced by polycondensing the polyol component and the polybasic carboxylic acid at 180° to 250° C. in an inert gas atmosphere. In order to accelerate the reaction, a common esterification catalyst such as zinc oxide, stannous oxide, dibutyltin oxide, and dibutyltin dilaurate can be used. Also, the process can be carried out under a reduced pressure for acceleration of the reaction.

The invention will be illustrated by the following non-limiting examples for the production and use of the resin.

PRODUCTION EXAMPLE 1

Into a 1-liter 4-neck glass flask equipped with a thermometer, stainless steel stirrer, condenser, and nitrogen inlet were charged 700 g of polyoxypropylene(2.2)-2,2-bis(4-hydroxyphenyl)propane, 130 g of fumaric acid, 53.4 g of n-dodecenylsuccinic anhydride, and 0.1 g of hydroquinone. Using an electric mantle heater, the reactants were heated to 230° C., with stirring under a nitrogen stream, until the water formed by reaction was not distilled out any longer. The acid value at that time was 1.5.

Subsequently, 63.4 g of trimellitic anhydride was added and reaction was continued for about 8 hours until the acid value reached 20. A light yellow solid resin having a ring and ball softening point of 120° C. was obtained.

COMPARATIVE EXAMPLE 1

Into the same apparatus as used in Example 1 were charged 700 g of polyoxypropylene(2.2)-2,2-bis(4-hydroxyphenyl)propane, 333 g of fumaric acid, and 0.1 g of hydroquinone. Reaction was continued at 220° C. with stirring under a nitrogen stream, until the acid value reached 20. A light yellow solid resin having a ring and ball softening point of 108° C. was obtained.

COMPARATIVE EXAMPLE 2

Into the same apparatus as used in Example 1 were charged 700 g of polyoxypropylene(2.2)-2,2-bis(4-hydroxyphenyl)propane, 153 g of fumaric acid, and 0.1 g of hydroquinone. Reaction was continued until the water formed by reaction was not distilled out any longer. The acid value at that time was 1.8.

Subsequently, 63.4 g of trimellitic anhydride was added and reaction was continued for about 8 hours until the acid value reached 20. A light yellow solid resin having a ring and ball softening point of 125° C. was obtained.

USAGE EXAMPLE 1

The resin obtained in Production Example 1 was incorporated with 65 wt % of styrene. The resulting clear polyester monomer solution was incorporated with benzoyl peroxide and then applied to a glass fiber mat. After curing at 90° C. for about 1 hour, an inflexible glass fiber laminate was obtained.

Then, the resin obtained in Comparative Example 1 was incorporated with 65 wt % of styrene. The resulting turbid solution was applied to a glass fiber mat in the same manner as above. The resulting glass fiber laminate underwent whitening and cracking when bent.

The resin obtained in Comparative Example 2 could not be dissolved in 65 wt. % of styrene completely. Thus, the resulting solution was not suitable for production of glass fiber laminate.

PRODUCTION EXAMPLE 2

Using the same apparatus as used in Production Example 1, 650 g of polyoxyethylene(2)-2,2-bis(4-hydroxyphenyl)propane, 120 g of fumaric acid, and 53.4 g of iso-dodecenylsuccinic anhydride were reacted at 220° C., until the water formed by reaction was not distilled out any longer. The acid value at that time was 1.3.

Subsequently, 79 g of trimellitic anhydride was added and reaction was continued at 200° C. until the ring and ball softening point reached 120° C. After the resin was left standing to achieve cooling and solidification, the resin was crushed into powder which passes a 42 mesh (350 μm) opening and comprises more than 80% of a fraction which passes a 42 mesh (350 μm opening) and remains on a 150 mesh (100 μm) opening.

COMPARATIVE EXAMPLE 3

Using the same apparatus as used in Production Example 1, 617 g of polyoxyethylene(2)-2,2-bis(4-hydroxyphenyl)propane, 232 g of fumaric acid, and 9 g of glycerin were reacted at 220° C., until the ring and ball softening point reached 120° C. After the resin was left standing to achieve cooling and solidification, the resin was crushed into a powder which passes 42 mesh and contains more than 80% of the fraction which passes 42 mesh and remains on 150 mesh.

USAGE EXAMPLE 2

A glass fiber mat was produced as follows using as a binder the resin powder obtained in Production Example 2.

The first glass fiber layer was prepared by spreading uniformly chopped glass strand on a perforated steel plate measuring 35 cm by 35 cm placed in a mat producing test machine equipped with a blower. Water was sprayed thereon for 10 seconds. With the blower stopped, the powder binder was spread uniformly on the mat. These steps were repeated four times to prepare a four-layered glass fiber mat. The mat was heated in an oven at 200° C. for 10 minutes. The quantity of the powder binder was controlled so that the final amount was 3 to 4 wt % based on the glass fiber. On removal from the oven, the glass fiber mat was cooled immediately by being put between two steel plates. After cooling, the mat was cut to a size of 10 cm by 25 cm, and this test piece was measured for tensile strength on an autographic tensile tester (made by Shimadzu Seisakusho).

On the other hand, the powder binder was evaluated for caking by calculating the caking index as follows:

The resin powder prepared in Production Example 2 was vacuum dried at normal temperature for 2 days. Exactly 12 g of this powder was placed in a 40 cc beaker, and allowed to stand in atmospheres of 35° C. and 40% RH, 70% RH and 100% RH for 2 days. The conditioned powder was kept pressed under a load of 200 g for 1 week. After removal of the load, the powder was taken out of the beaker slowly so as not to break the shape. The lump of the powder was dropped on a 20 mesh screen from a height of 50 cm. After slight shaking of the screen, the quantity of the powder remaining on the screen was measured. Letting the weight be W grams, the caking index is given by the following expression:

Caking index = W × 100/12

The resin prepared in Comparative Example 3 and a commercial binder resin having the same particle size as that resin were evaluated for caking index, and the glass fiber mats produced therefrom were measured for tensile strength in the same manner as above. The commercial binder resin was Atlack 363E (made by Kao Atlas), having an acid value of 15 and a ring and ball softening point of 112° C., made from polyoxyethylene(2)-2,2-bis(4-hydroxyphenyl)propane and fumaric acid. The results are shown in Table 1.

TABLE 1

| | Mat tensile strength (kg) | Caking Index 35° C., 40% RH | 35° C., 70% RH | 35° C., 100% TH |
|---|---|---|---|---|
| Resin powder of Product. Ex. 2 | 18.0 | 0 | 0 | 5 |
| Resin powder of Comp. Ex. 3 | 15.5 | 0 | 55 | 85 |
| Atlack 363E resin powder | 15.0 | 0 | 45 | 75 |

Table 1 indicates that the resin powder obtained in Production Example 2 is superior in mat tensile strength and is more resistant to caking.

PRODUCTION EXAMPLE 3-1

Using the same apparatus as used in Production Example 1, 490 g of polyoxypropylene(2.2)-2,2-bis(4-hydroxyphenyl)propane, 195 g of polyoxyethylene(2)-2,2-bis(4-hydroxyphenyl)propane, 188 g of terephthalic acid, 26.8 g of n-dodecyl succinic anhydride, and 0.8 g of diisopropyl orthotitanate as an esterification catalyst were reacted at 230° C. for about 5 hours until the acid value reached 2.0.

Subsequently, 78.8 g of trimellitic anhydride was added and the reaction was continued at 200° C. for about 4 hours under reduced pressure until the ring and ball softening point reached 115° C. A light yellow solid resin having an acid value of 33 was obtained.

PRODUCTION EXAMPLE 3-2

In the same manner as Production Example 3-1, a resin having a softening point of 120° C. was obtained. The resins obtained in Production Examples 3-1 and 3-2 were soluble in organic solvents such as dioxane and methyl ethyl ketone.

COMPARATIVE EXAMPLE 4-1

Using the same apparatus as used in Production Example 1, 490 g of polyoxypropylene(2.2)-2,2-bis(4-hydroxyphenyl)propane, 195 g of polyoxyethylene(2)-2,2-bis(4-hydroxyphenyl)propane, 204.3 g of terephthalic acid, and 0.8 g of diisopropyl orthotitanate were reacted at 230° C. for about 5 hours. Subsequently, 78.8 g of trimellitic anhydride was added and reaction was continued at 200° C. for about 4 hours under reduced pressure until the ring and ball softening point reached 115° C. A light yellow solid resin having an acid value of 34 was obtained.

COMPARATIVE EXAMPLE 4-2

Comparative Example 4-1 was repeated except that the reaction was continued until the softening point reached 120° C.

COMPARATIVE EXAMPLE 4-3

Comparative Example 4-1 was repeated except that the reaction was continued until the softening point reached 125° C.

COMPARATIVE EXAMPLE 5-1

Using the same apparatus as used in Production Example 1, 490 g of polyoxypropylene(2.2)-2,2-bis(4-hydroxyphenyl)propane, 195 g of polyoxyethylene(2)-2,2-bis(4-hydroxyphenyl)propane, 97 g of terephthalic acid, and 0.8 g of diisopropyl orthotitanate were reacted at 230° C. for about 5 hours. The acid value was 1.8. Subsequently, 156 g of trimellitic anhydride was added and reaction was continued at 200° C. for about 5 hours until the ring and ball softening point reached 120° C. The resulting light yellow solid resin was insoluble in all the solvents tested, and it was very difficult to clean from the reaction apparatus.

COMPARATIVE EXAMPLE 5-2

Comparative Example 5-1 was repeated except that the reaction was continued until the softening point reached 125° C. The resulting light yellow solid resin was insoluble in all the solvents tested, and it was very difficult to clean from the reaction apparatus.

In both Comparative Examples 5-1 and 5-2, the polymerization rate was so high that there was a danger that the resin would solidify in the reaction apparatus.

USAGE EXAMPLE 3

An electrophotographic toner was prepared as follows. Ninety-five parts of the resin obtained in Production Example 3-1, was mixed with 5 parts of carbon black in a ball mill, and then kneaded by a hot roll. After cooling and solidifying, the resin mixture was crushed by a hammer and then by a jet mill into fine powder having an average particle size of about 15 microns.

In the same manner as above, fine powders of the same particle size was prepared from the resins obtained in Production Example 3-2 and Comparative Examples 4-1 to 5-2.

Five grams of each of the black fine powders were mixed with 95 g of iron powder of 150 to 200 mesh to make electrophotographic toners. The toners were evaluated for the quality of images and offset by applying them by the magnetic brush method. The results are shown in Table 2.

TABLE 2

| Resins | Ring and ball softening point (°C.) | Off-set | Quality of image |
|---|---|---|---|
| Resin of Prod. Ex. 3-1 | 115 | No | Good |
| Resin of Prod. Ex. 3-2 | 120 | No | Good |
| Resin of Comp. Ex. 4-1 | 115 | Yes | Blurred |
| Resin of Comp. Ex. 4-2 | 120 | Yes | Good |
| Resin of Comp. Ex. 4-3 | 125 | No | Poor fix |
| Resin of Comp. Ex. 5-1 | 120 | Yes | Good |
| Resin of Comp. Ex. 5-2 | 125 | No | Poor fix |

Table 2 indicates that the toners prepared from the resins obtained in Production Examples 3-1 and 3-2 gave good images without causing offset, even in the case of the resin having a lower softening point.

In contrast, the resins obtained in Comparative Examples 4-1 to 4-3 caused offset, except for the resin having the highest softening point which was poor in fixation. This was also true in the case of the resins obtained in Comparative Examples 5-1 and 5-2. As mentioned above, these resins are more difficult to produce than the resin of this invention.

What is claimed is:

1. In a process for producing a polyester resin by condensation polymerization of (a) a diol component having the formula:

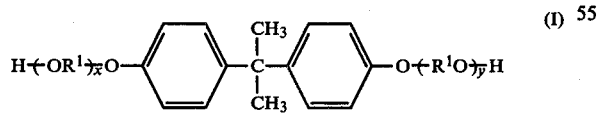

wherein $R^1$ is an alkylene group of 2 to 4 carbon atoms, and x and y are positive integers, the sum of x and y being 2 to 16, and (b) an acid component selected from the group consisting of polybasic carboxylic acids, anhydrides thereof, and lower alkyl esters thereof, the improvement which comprises: said acid component (b) contains (1) 1 to 50 mol % of a dibasic carboxylic acid or anhydride thereof having the formula:

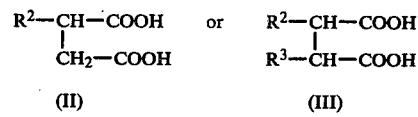

wherein $R^2$ and $R^3$ are saturated or unsaturated hydrocarbon groups of 4 to 20 carbon atoms, and (2) 10 to 30 mol % of trimellitic acid or anhydride thereof.

2. A process as claimed in claim 1, wherein said dibasic carboxylic acid or anhydride thereof of the formula (II) or (III) is selected from the group consisting of n-dodecenylsuccinic acid, iso-dodecenylsuccinic acid, n-dodecylsuccinic acid, iso-dodecylsuccinic acid, iso-octylsuccinic acid, and n-butylsuccinic acid.

3. A process as claimed in claim 1, wherein said condensation polymerization is conducted at 180° to 250° C. in an inert gas atmosphere, in the presence of an esterification catalyst.

4. A process as claimed in claim 3 in which the balance of said acid component (b) is selected from the group consisting of phthalic acid, isophthalic acid, terephthalic acid, fumaric acid, maleic acid, available anhydrides thereof and lower alkyl esters thereof.

5. A process according to claim 3, wherein said esterification catalyst is selected from the group consisting of zinc oxide, stannous oxide, dibutyltin oxide, dibutyltin dilaurate, and diisopropyl orthotitanate.

6. A process according to claim 1, wherein the balance of said acid component (b) is fumaric acid or maleic acid.

7. A process according to claim 1, wherein the amount of said trimellitic acid or anhydride thereof in said acid component (b) is 20 to 30 mol %.

8. A process for preparing a polyester resin which consists essentially of the steps of:
condensation polymerizing a reaction mixture consisting essentially of
(1) a diol compound of the formula:

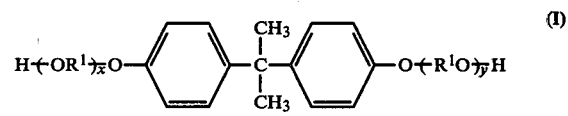

wherein R' is alkylene having 2 to 4 carbon atoms and x and y are positive integers such that the sum of x and y is from 2 to 16;
(2) a dibasic carboxylic acid or anhydride thereof having the formula

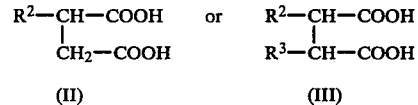

wherein $R^2$ and $R^3$ are saturated or unsaturated hydrocarbon groups having 4 to 20 carbon atoms, and
(3) at least one compound selected from the group consisting of phthalic acid, isophthalic acid, terephthalic acid, fumaric acid, maleic acid, available anhydrides thereof and lower alkyl esters thereof, at a temperature in the range of 180° C. to 250° C., in an inert atmosphere, in the presence of an esterification catalyst, while removing by-produced water from said reaction mixture, until substantially no further water can be removed therefrom; then adding (4) trimellitic acid or anhydride thereof to said reaction mixture and effecting further condensation polymerization of the resulting reaction mixture; with the provisos that the amount of said trimellitic acid or anhydride added is 10 to 30 mol % based on the total amount of (2), (3) and (4) and the amount of said acid or anhydride (2) is 1 to 50 mol % based on the total amount of (2), (3) and (4); and then recovering the resulting polyester resin.

9. A polyester resin prepared by the process as claimed in claim 1.

10. A polyester resin prepared by the process as claimed in claim 4.

11. A polyester resin prepared by the process as claimed in claim 6.

12. A polyester resin prepared by the process as claimed in claim 8.

* * * * *